United States Patent [19]

Spreeuwers

[11] Patent Number: 4,604,307
[45] Date of Patent: Aug. 5, 1986

[54] TUBULAR OBJECT OF A LAYERED PLASTICS MATERIAL AND A METHOD FOR THE MANUFACTURE THEREOF

[75] Inventor: Harm R. Spreeuwers, Heelsum, Netherlands

[73] Assignee: Akzo N.V., Arnhem, Netherlands

[21] Appl. No.: 624,289

[22] Filed: Jun. 25, 1984

[30] Foreign Application Priority Data

Jul. 18, 1983 [NL] Netherlands ......................... 8302560

[51] Int. Cl.$^4$ .............................................. B29C 17/07
[52] U.S. Cl. ...................................... 428/35; 215/1 C; 220/450; 220/453; 220/DIG. 14; 156/86; 428/481
[58] Field of Search ................... 428/35, 36, 480, 481; 264/230, 289.6, DIG. 71; 156/86, 294, 313; 220/450, 453, DIG. 14; 215/1 C

[56] References Cited

U.S. PATENT DOCUMENTS

| | | |
|---|---|---|
| 2,784,456 | 3/1957 | Grabenstein . |
| 2,989,785 | 6/1961 | Stahl . |
| 4,014,724 | 3/1977 | Rausing . |
| 4,172,873 | 10/1979 | Spicer . |
| 4,198,458 | 4/1980 | Mitsuishi et al. ................... 428/212 |
| 4,233,022 | 11/1980 | Brady et al. . |
| 4,355,756 | 10/1982 | Furuya et al. ....................... 229/4.5 |
| 4,436,777 | 3/1984 | Karpiloff ............................... 428/36 |

FOREIGN PATENT DOCUMENTS 0052490 5/1982 European Pat. Off. .
2094702 3/1982 United Kingdom .

Primary Examiner—John E. Kittle
Attorney, Agent, or Firm—Tom R. Vestal; Francis W. Young

[57] ABSTRACT

Multilayer tubular container as a means of transport and storage for chemicals, beverages, food, etc. It is provided with a tubular casing of a particular inner cross-section, the casing being composed of a first layer of a both axially and radially oriented polyethylene terephthalate and having a thickness of 50–1000 μm, and of a second layer which has been shrunk onto said first layer. The polyethylene terephthalate of the first layer is heat-set into the shape of said cross-section to a degree of crystallization of at least 25%. A film-like intermediate layer is compressed between the first and the second layers, e.g., to improve the gas barrier properties. The second layer is composed of a both axially and radially oriented polyethylene terephthalate having a thickness of 75–1000 μm, and is heat-set to a degree of crystallization of at least 25% on the form of the intermediate layer. This container is dimensionally stable at high temperatures, particularly sterilization temperatures.

13 Claims, 1 Drawing Figure

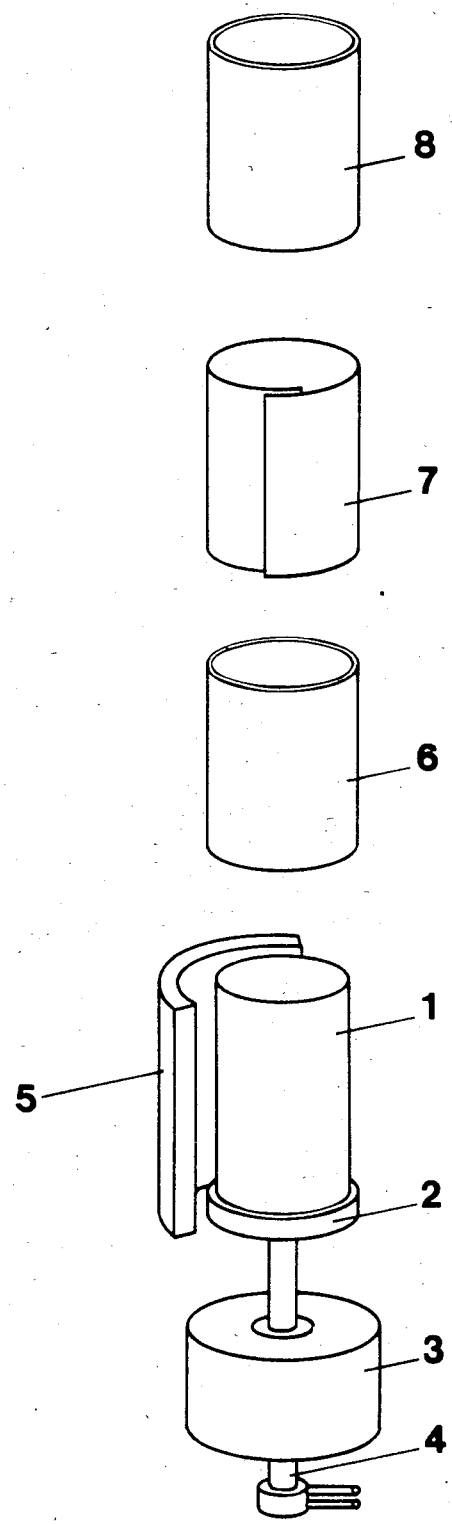

TUBULAR OBJECT OF A LAYERED PLASTICS MATERIAL AND A METHOD FOR THE MANUFACTURE THEREOF

The application relates to a tubular object of a layered plastics material for transporting and packaging substances such as chemicals, beverages, foodstuffs and the like and having a tubular wall of a particular internal cross-section, which wall comprises a first layer of axially and radially molecularly oriented polyethylene terephthalate having a thickness of 50 to 1000 μm onto which a second layer of a plastics material is shrunk. The application also relates to a process for the manufacture of such a tubular object of a layered plastics material.

An object having a tubular wall of the type indicated above is known from U.S. Pat. No. 4,172,873. It describes a container consisting of a blow moulded polyethylene terephthalate bottle having a cylindrical wall onto which a thin thermoplastic sleeve is shrunk. The patent specification mentions polyvinyl chloride as material for the sleeve, which has a wall thickness of 50 μm and is oriented in radial direction to have a heat shrinkage of 65%. This patent specification also describes a special method of heat shrinking the sleeve around the polyethylene terephthalate bottle while avoiding appreciable shrinkage of the bottle as a result of heating the shrinking sleeve. The heat shrinkable sleeve may previously be decorated with product information and according to said patent specification the heat shrinkable sleeves are applied to bottles especially to provide information about their contents.

U.S. Pat. No. 2,989,785 describes a process for manufacturing tubular containers from extruded polyethylene terephthalate tubing. A section of said tubing is placed on a somewhat smaller mandrel in such a way that one end of the tube extends beyond a disk-shaped end part of the container to be formed, which part is placed against the end of the mandrel. Heating to about 200° C. will cause the oriented tube to shrink both on the mandrel and on the end part, as a result of which the latter is locked within the tube. The thickness of the tube is mentioned to be in the range of 50 to 250 μm.

U.S. Pat. No. 2,784,456 describes a process for forming heat-shrinkable film of polyethylene terephthalate and the shrinkage of that film upon its being heated. Such a film is made by extruding molten polyethylene terephthalate followed by cooling to the extent that the polymer solidifies in the amorphous state. The film is pre-heated and stretched at 85°–135° C. in a direction perpendicular to the direction in which it has been extruded. The heat-shrinkable film described has a thickness of 18–65 μm and is stretched 1.5–3.0 times. The tensionless shrinkage of the film in the direction of extrusion is about 10–30% and in the direction perpendicular to it 20–50% and is produced by heating the shrinkable film to 100°–150° C.

It is known that the tubular wall of biaxially oriented bottles of polyethylene terephthalate as mentioned in said U.S. Pat. No. 4,172,873 has a wall thickness of about 200–400 μm. For some beverages the permeability to gases such as carbon dioxide and oxygen will be sufficiently low then to ensure a sufficiently long shelf life of beverages thus packaged. Obviously, by shrinking a 50 μm thick polyvinyl chloride film onto a bottle wall, its permeability to these gases will still decrease somewhat. For some beverages, however, the permeability to gases and some other substances will still be too high then. Particularly, the permeability will be too high of containers for prolonged storage and of containers for preserves such as vegetables, fruit and fruit juices.

Another drawback consists in that the above-described bottle of biaxially oriented polyethylene terephthalate onto which a polyvinyl chloride sleeve is shrunk has insufficient dimensional stability at an elevated temperature in the range of, say, 110° to 130° C., needed for sterilizing the container before it is filled or afterwards. At even higher temperatures the polyvinyl chloride will soften and the polyethylene terephthalate will be subject to further disorientation.

The invention has for its object to provide a laminated tubular object having a very high impermeability to gases such as carbon dioxide and oxygen and a high thermal dimensional stability. A further object of the invention is providing a layered tubular object having such a high mechanical strength as will enable it to take up higher forces, for instance as a wall of vessels having a capacity of 2000–25000 $cm^3$ and pressure loaded hose.

The tubular object according to the invention is characterized in that the polyethylene terephthalate of the first layer is thermally stabilized in the form of the cross-section up to a degree of crystallization of at least 25%, and a film-shaped interlayer is clamped between the first and the second layer of the wall and the second layer is formed from axially and radially oriented polyethylene terephthalate having a thickness of 75–1000 μm and thermally stabilized on the form of the interlayer up to a degree of crystallization of at least 25%. In addition to the above-mentioned properties the object this obtained has the advantage that because of the relatively high wall thickness of the second layer its resistance to mechanical damage is high; more particularly the inter-layer is effectively protected against damage.

Despite the thickness of the second layer it appears that upon shrinkage it fits smoothly on the interlayer applied to the thermo-dimensionally stable first layer. After shrinkage the second layer exerts a high clamping force on the interlayer, and hence on the first layer. The layers being thus clamped together will impart great coherence to the object. The resulting bond is so strong that there is no need for the use of adhesives between the layers. For some applications the use of adhesives may be of advantage and is not excluded here.

Another advantage is that although the polyethylene terephthalate of the first and second layers is crystallized to at least 25%, both layers are transparent, provided that the polyethylene terephthalate is sufficiently oriented. Suitable stretching factors to that end are 2–5, preferably 3–4 in radial direction and 1.05–4, preferably 1.1–2 in axial direction of the tubular object. This transparency is of great importance for products such as hose and reservoirs in that it makes the level of their contents visible, but of course only if the interlayer is also transparent. If use is made of a non-transparent interlayer, it need only be provided with a long narrow interruption, which may however, cause some increase in permeability. The interlayer may be in the form of a sheet, web, film, net, gauze or like material and serves to enhance specific properties of the object or impart them to it, such as high impermeability to gases or light. The interlayer is preferably freely positioned between the first and the second polyethylene terephthalate layer. This facilitates the recovery of the polyethylene terephthalates after use of the object in that the interlayer is readily separable then.

Preference is given to an embodiment in which the first and second polyethylene layers are identical as far as thickness is concerned and preferably they also have the same molecular orientation. The material of the interlayer may be chosen as a function of the use envisaged. An interlayer of paper provided or not with particular information is generally sufficient and very suitable if the contents are to be especially protected from the action of light. To that end also use may be made of thin metal foil, e.g. of aluminium. For some uses which require the discharge of static electricity from the container wall said metal interlayer may be earthed. Use of an interlayer of metal foil having a thickness of 3-10 $\mu$m appears to lead to an object which likewise is highly impervious to gases and therefore constitutes a very suitable wall material for containers of beer, preserves and the like.

A high imperviousness to gases is also obtained if the interlayer consists of a film of a polymer having a high impermeability to gases. Very suitable polymers are those of ethylene vinyl alcohol, vinylidene chloride, vinyl acetate, acrylonitrile. The thickness of the interlayer is chosen as a function of the envisaged imperviousness of the container. A layer thickness of 10-30 $\mu$m will generally result in the low permeability desired. Because of its high mechanical strength the tubular layered object is particularly suitable for containers that are to be very impervious to gases and have a capacity of 2000-25000 cm$^3$ or even higher. As an example is mentioned the use as wall of beer barrels and barrels for carbon dioxide-containing beverages. For such barrels the thickness of the second layer is preferably 200-1000 $\mu$m. For small containers, such as those having a capacity of 250-2000 cm$^3$, relatively smaller layer thicknesses will be needed. It is preferred that the second layer of such containers should have a thickness of 75-200 $\mu$m. Both the large and the small containers can be made by attaching end parts or lids to the wall ends. Surprisingly, it has been found that the way in which plate-shaped end parts are fastened to cylindrical walls of tin plate by folding the edges of the end part can also be used for attaching such end parts to the layered tubular object.

In that case the ends of the layers are folded together with the edge of the lid. It is also possible to attach at least one lid to the wall by shrinking in accordance with the method of the afore-mentioned U.S. Pat. No. 2,989,785 or by welding, such as friction welding and ultrasonic welding. The lids may be of metal, such as aluminium, or of some synthetic material, such as polyethylene terephthalate. The lids may be thermally stabilized for enhanced dimensional stability.

Another suitable use is the application as outer layer or shuttering for poles of cement or concrete. These poles are thereby provided with smooth surface, which can easily be kept clean and be given a decorative appearance. A particular important field of application is found there where the wall is to satisfy high requirements as regards dimensional stability at elevated temperature. Thermal dimensional stability is enhanced as a result of postcrystallization of the polyethylene terephthalate by sufficient heating. This is of importance to linings of reservoirs and conduits for hot substances, for instance in the case of hot-air heating apparatus, stacks and lighting fixtures, packaging and guiding hot fluids and in heat-sterilizing foods and beverages.

The method according to the invention for the manufacture of the tubular object of the layered synthetic material having a tubular wall of a particular internal cross-section comprises making the wall by forming a first layer which is obtained by axially and radially stretching a polyethylene terephthalate tubular section to a wall thickness of 50-1000 $\mu$m, forming a second layer by thermally shrinking onto the first layer a second tubular section of some plastics material previously stretched in axial and radial direction, characterized in that the first layer is formed by sliding the first tubular section on a mandrel whose external shape corresponds to that of the internal cross-section of the container to be formed, heating this tubular section to above 80° C., as a result of which this tubular section will shrink up to 30% in radial direction onto the mandrel, and on the first layer there is provided an interlayer over which there is slid the second tubular section which is also of polyethylene terephthalate and the second tubular section is heated to above 80° C., upon which this tubular section will shrink up to 30% in radial direction onto the interlayer and lock up the latter, and the second layer is given a wall thickness of 75 to 1000 $\mu$m, and the polyethylene terephthalate of the first and second layers is stabilized by heating to a degree of crystallization of at least 25%.

This method has the great advantage that the resulting tubular objects have a high and reproducible dimensional stability. Shrinking the second layer onto the interlayer covering the first layer, which had been shrunk onto the mandrel, the first and the second layer being thermally stabilized in that state, makes it possible to obtain objects of perfect dimensional and thermal stability. The internal shape of the tubular object conforms exactly with the external shape of the mandrel used. Nor are the relatively high compressive forces exerted by the second layer on the first layer after shrinkage found to lead to deformation of the first layer at temperatures below the stabilization temperature.

Another advantage is that because of the absence of deformations the interlayer between the first and the second layer remains perfectly smooth and without any wrinkles, which is for instance beneficial to the impermeability to gases.

The high dimensional stability is of great importance to the further processing of the tubular object, particularly as regards machine fitting the edges with pre-fabricated end-parts such as lids.

The most advantageous procedure generally consists in that the two polyethylene terephthalate layers are simultaneously stabilized by heating. Alternatively, however, stabilizations of the polyethylene terephthalate of the first layer may take place after shrinkage heating. A suitable method of making biaxially oriented polyethylene terephthalate tubing is described in European patent application No. 52 490. In the procedure described in it an endless tube of some unspecific thermoplastic material is stretched mechanically and stepwise in a mould over a set distance and simultaneously stretched in radial direction by internal pressure. After the stretching operation the stretched part is cut off. It is also mentioned that if containers comprising such a tubular section are to be sterilized along with their contents, the tube can for some time be kept at a temperature higher than the sterilization temperature in order to impart dimensional stability to the tube at that temperature.

The method according to the invention can be carried out using hot air or infrared radiators or like means. These means are well known from the art.

The mandrel is preferably thin-walled and made of metal for proper thermal conduction. When after shrinkage and stabilization of a tubular section the mandrel is cooled, the tube can be readily removed from it. The cross-section of the mandrel need not be circular. Also suitable are square, rectangular or rippled cross-sections, preferably having somewhat rounded corners. A simplified method is obtained if prior to shrinkage the first and the second tubular section have the same cross-section. They can be cut out of one and the same biaxially oriented tube then. Suitable stretching factors for the tubing are 2–5, preferably 3–4 in radial direction and 1.05–4, preferably 1.2–2 in axial direction. The interlayer of, say, paper, metal foil or plastics film chosen as a function of the use of the tubular object can be slid over the first layer as a slit sleeve and will remain flat then upon a decrease in diameter. The interlayer also may be formed by spraying a resinous substance onto the first layer or by dipping the layer into it. For convenience, however, the interlayer is applied without using an adhesive. It is recommended that the interlayer should be so pre-formed that it will lie flat on the shrunk, first layer and with its edges practically contiguous. With thin films used for the interlayer the edges are permitted to overlap after shrinkage.

For the method of determining the crystallinity reference may be had to the literature on polyethylene terephthalate.

Following is a further description of the invention with reference to the accompanying drawings.

The drawing is a schematic view in perspective illustrating the manufacture of the tubular layered object.

In the drawing numeral 1 refers to a hollow, metal mandrel having a circular cross-section and a rim 2 having a larger diameter. The mandrel can be rotated with the aid of a motor 3. The mandrel can be internally heated and cooled by the supply and discharge of a medium through a shaft 4. Moreover, a heat radiator 5 is positioned near the mandrel in such a way that as the mandrel rotates, the surface is evenly heated. Numeral 6 refers to a first tubular section of biaxially oriented polyethylene terephthalate. The interlayer 7, whose height is the same or somewhat smaller than that of the tubular section 6, is longitudinally divided so that the ends overlap, Numeral 8 refers to the second length of tubing of biaxially oriented polyethylene terephthalate.

The method is now so carried out that first the piece 6 is slid over the mandrel 1 up to the rim 2 and while the mandrel is rotating it is heated until shrinkage occurs. Next, the interlayer 7 and the piece of tubing 8 are successively placed on the first layer and heating is continued until also the piece of tubing 8 had shrunk. Subsequently, the tubing is heated to a temperature which is about 20° C. above the service temperature of the tubing over a period sufficiently long to attain the crystallinity desired. After the mandrel has cooled, the object is removed therefrom.

EXAMPLE 1

A tubular wall is made for a meat container with a capacity of 500 cm³. After the container has been filled, the packaging material is to be sterilized for 30 minutes at 120°–130° C.

For the manufacture of the container wall use is made of an extruded tube of amorphous polyethylene terephthalate having an external diameter of 24.0 mm and an internal diameter of 21.6 mm.

The polyethylene terephthalate has a relative viscosity of 2.15 determined on a solution of 1 g in 100 g of metacresol at 25° C. The tube is heated to 105° C. and stretched under internal pressure by a factor of 3.5 in radial and a factor of 2.0 in axial direction up to an external diameter of 80 mm and a wall thickness of 165 μm. The resulting tube is cut into lengths of 145 mm.

An apparatus of the type as described with reference to the drawing is used for making a layered length of tubing by shrinkage onto a mandrel having an external diameter of 73 mm. The mandrel is heated to 160° C.

After the first layer has been slid over the mandrel and been shrunk an interlayer in the form of a 230 mm wide aluminium foil having a thickness of 5 μm is placed on the first layer. To it the second layer is applied which shrinks on the interlayer as a result of heating. After shrinkage the mandrel is kept at 160° C. for 10 seconds and subsequently cooled to 60° C. The layered piece of tubing can then be removed from the mandrel. The average crystallinity of the polyethylene terephthalate is found to be 34%. The tubular section has a length of 136 mm and is cut off clean to a length of 130 mm. An aluminium lid is folded onto one end of the tubular section and after the container has been filled a second lid is folded onto it. After sterilization at 130° C. the container is found to display a shrinkage in volume of less than 1%.

EXAMPLE 2

A tubular wall is made for a beer container having a capacity of 330 cm³. After the container has been filled, it is to be pasteurized at 60° C. The same procedure is used as in Example 1. The tube of polyethylene terephthalate has an external diameter of 20.1 mm and an internal diameter of 18.9 mm and is stretched 3.6 times in radial and 2.0 times in axial direction. The wall thickness appears to be 85 μm. Tubular lengths of 136 mm are shrunk and stabilized on a mandrel 63 mm in diameter at a temperature of 140° C.

The piece of tubing obtained is cut off clean to a length of 116 mm and provided with a lid.

The crystallinity of the polyethylene terephthalate appears to be 29%. At a pasteurization temperature of 60° C. the shrinkage in volume of the container is less than 1%.

I claim:

1. A layered, rigid, dimensionally stable tubular object for packaging and transporting chemicals, beverages, foodstuffs and the like, comprising a first layer of 50 to 1000 μm thickness, a film-shaped interlayer and a second layer of 75 to 1000 μm thickness, said first and second layers being of axially and radially molecular oriented polyethylene terephthalate, said first layer forming the inner wall of the object and said second layer being shrunk onto and clamping the interlayer onto the first layer, said first layer and second layer being of substantially the same thickness and, further, thermally stabilized up to a degree of crystallization of at least 25%.

2. A tubular object according to claim 1, characterized in that the interlayer is of paper.

3. A tubular object according to claim 1, characterized in that the interlayer is of metal foil.

4. A tubular object according to claim 1, characterized in that the interlayer is a plastics film having a low permeability to gas.

5. A tubular object according to claim 1, characterized in that the second layer has a thickness of 75-200 μm.

6. A tubular object according to claim 1, characterized in that the second layer has a thickness of 200-1000 μm.

7. A tubular object according to claim 1, characterized in that at least at one end of the wall a metal lid is folded onto the ends of the layers.

8. A method for the manufacture of a tubular object of layered synthetic material for transporting and packaging substances such as chemicals, beverages, foodstuffs, and the like and having a tubular wall of a particular internal cross-section, comprising making the wall by forming a first layer which is obtained by axially and radially stretching a polyethylene terephthalate tubular section to a wall thickness of 50-1000 μm, forming a second layer by thermally shrinking onto the first layer a second tubular section of some plastics material previously stretched in axial and radial direction, characterized in that the first layer is formed by sliding the first tubular section on a mandrel whose external shape corresponds to that of the internal cross-section of the container to be formed, heating this tubular section to above 80° C., as a result of which this tubular section will shrink up to 30% in radial direction onto the mandrel, and on the first layer there is provided an interlayer over which there is slid the second tubular section which is also of polyethylene terephthalate and the second tubular section is heated to above 80° C., upon which this tubular section will shrink up to 30% in radial direction onto the interlayer and lock up the latter, and the second layer is given a wall thickness of 75 to 1000 μm, and the polyethylene terephthalate of the first and second layers is stabilized by heating to a degree of crystallization of at least 25%.

9. A method according to claim 8, characterized in that the polyethylene terephthalate of the first layer is stabilized subsequent to shrinkage heating.

10. A method according to claim 8, characterized in that prior to shrinkage the first and the second tubular section have the same cross-section and were stretched 2-5 times, preferably 3-4 times in radial direction and 1.05-4 times, preferably 1.2-2 times in axial direction.

11. A method according to claims 8, characterized in that the interlayer is in the form of a paper sleeve.

12. A method according to claim 8, characterized in that the interlayer is in the form of a sleeve of aluminium foil.

13. A method according to claims 8, characterized in that the interlayer is in the form of a sleeve of plastics film.

* * * * *